US011803199B2

(12) United States Patent
Heimann

(10) Patent No.: US 11,803,199 B2
(45) Date of Patent: Oct. 31, 2023

(54) DUAL SET-POINT PRESSURE REGULATING SYSTEM

(71) Applicant: AQUESTIA LTD., D.N. Ramat Hagolan (IL)

(72) Inventor: Assaf Heimann, Moshav Lachish (IL)

(73) Assignee: AQUESTIA LTD., D.N. Ramat Hagolan (IL)

( * ) Notice: Subject to any disclaimer, the term of this patent is extended or adjusted under 35 U.S.C. 154(b) by 0 days.

(21) Appl. No.: 17/861,601

(22) Filed: Jul. 11, 2022

(65) Prior Publication Data

US 2023/0084303 A1 Mar. 16, 2023

Related U.S. Application Data

(63) Continuation-in-part of application No. 16/754,310, filed as application No. PCT/IL2018/051145 on Oct. 25, 2018, now abandoned.

(60) Provisional application No. 62/577,184, filed on Oct. 26, 2017.

(51) Int. Cl.
 *G05D 16/02* (2006.01)
 *G05D 16/06* (2006.01)

(52) U.S. Cl.
 CPC ......... *G05D 16/02* (2013.01); *G05D 16/0655* (2013.01)

(58) Field of Classification Search
 CPC . G05D 16/163; F16K 31/126; F16K 31/1262; F16K 31/1266; F16K 31/128
 See application file for complete search history.

(56) References Cited

U.S. PATENT DOCUMENTS

| | | | |
|---|---|---|---|
| 436,235 | A | 9/1890 | Griffin |
| 2,991,796 | A | 7/1961 | Griswold |
| 3,136,333 | A | 6/1964 | Griswold |
| 3,669,143 | A | 6/1972 | Reese |
| 5,460,196 | A | 10/1995 | Yonnet |
| 5,967,176 | A | 10/1999 | Blann et al. |
| 6,935,362 | B1 | 8/2005 | Yonnet |
| 7,318,447 | B2 | 1/2008 | Law |
| 7,610,928 | B2 | 11/2009 | Feldman et al. |
| 8,276,612 | B2 | 10/2012 | Folk |

(Continued)

FOREIGN PATENT DOCUMENTS

| | | |
|---|---|---|
| CN | 1906554 A | 1/2007 |
| CN | 101699109 A | 4/2010 |

(Continued)

*Primary Examiner* — Umashankar Venkatesan
(74) *Attorney, Agent, or Firm* — Dorsey & Whitney LLP

(57) ABSTRACT

A PRV is provided, comprising an inlet, an outlet, and a pressure regulating system therebetween to maintain a set pressure at the outlet. The PRV further comprises a selection system configured to select between the two working pressures based on the pressure of the fluid at the inlet of the PRV, and to direct the pressure regulating system to maintain the set pressure at the outlet at the selected working pressure. The selection system comprises a pressure-motion transducer for directing the set pressure when in pressure communication with the inlet, and an auxiliary valve having an auxiliary inlet in pressure communication with the inlet and an auxiliary outlet in pressure communication with the pressure-motion transducer. The auxiliary valve is configured to establish pressure communication between its inlet and outlet when pressure in the inlet traverses a predetermined threshold.

20 Claims, 4 Drawing Sheets

(56) References Cited

U.S. PATENT DOCUMENTS 8,967,175 B2    3/2015    Azoulay et al.
9,298,190 B2    3/2016    Oksanen et al.

FOREIGN PATENT DOCUMENTS

| CN | 102506222 A | 6/2012 |
|---|---|---|
| CN | 104455659 A | 3/2015 |
| DE | 202007014709 U1 | 1/2008 |
| GB | 1431695 A | 4/1976 |
| GB | 2119132 A | 11/1983 |
| GB | 2450125 A | 12/2008 |

DUAL SET-POINT PRESSURE REGULATING SYSTEM

TECHNOLOGICAL FIELD

The presently disclosed subject matter relates to dual set-point pressure regulating systems installed on fluid pipelines and add-ons thereto.

BACKGROUND

Traditional hydraulic pressure reducing valves (PRV's) can be installed on fluid pipelines, such as water pipelines, in order to regulate the fluid pressure in them.

Some PRV's are configured to reduce fluid pressure upstream a pipeline to a stable set-pressure downstream, and maintain this set-pressure downstream as upstream pressure differentiates.

Graphically speaking, PRV's are configured to convert a differentiating pressure profile input to a steady pressure profile output downstream.

GENERAL DESCRIPTION

The presently disclosed subject matter relates to a PRV having an adjustable set pressure towards which downstream pressure is forced to tend, and a selection system configured to be cooperated therewith to select between two or more distinct working pressures automatically and direct the set pressure of the PRV accordingly. The selection is conducted in accordance with pressure upstream the PRV.

According to an aspect of the presently disclosed subject matter, there is provided a pressure regulating valve (PRV) comprising a PRV inlet at an upstream end thereof, a PRV outlet at a downstream end thereof, and a pressure regulating system operatively disposed therebetween being configured to maintain a set pressure at the PRV outlet by regulating the flow of fluid between the PRV inlet and the PRV outlet, the set pressure being selected from two or more distinct predetermined working pressures of the PRV;

the PRV further comprises a selection system configured to select between the two working pressures based on the pressure of the fluid at the inlet of the PRV, and to direct the pressure regulating system to maintain the set pressure at the outlet at the selected working pressure, the selection system comprising:

a pressure-motion transducer operatively connected to the pressure regulating system so as to actively direct the set pressure when being brought into pressure communication with the PRV inlet; and an auxiliary valve having an auxiliary inlet connected in pressure communication with the PRV inlet, and an auxiliary outlet connected in pressure communication with the pressure-motion transducer; the auxiliary valve being configured to selectively establish pressure communication between its auxiliary inlet and auxiliary outlet when pressure in the PRV inlet traverses a predetermined threshold, thereby bringing the pressure-motion transducer into pressure communication with the PRV inlet.

The pressure regulating system can further comprise a controlling element configured to control the set pressure of the PRV, and wherein the pressure motion transducer can be configured to operate the controlling element so as to direct the set pressure of the PRV.

The controlling element can be mechanical.

The controlling element can be a spring configured to compress to increase the set pressure and decompress to lower the set pressure.

The pressure regulating system can further comprise a control chamber in pressure communication with the PRV inlet, and wherein the pressure regulating system can be configured to facilitate restriction to fluid flow between the PRV inlet and the PRV outlet when the control chamber is pressurized.

The pressure regulating system can further comprise a pilot valve in pressure communication with the control chamber and the PRV outlet which is configured to depressurize the control chamber when pressure at the outlet traverses a predetermined threshold.

The controlling element can constitute a part of the pilot valve.

The selection system can be hydraulically operated.

The pressure regulating system can be hydraulically operated.

The auxiliary valve can be a three way valve. The auxiliary valve can be configured to selectively establish pressure communication between its auxiliary inlet and auxiliary outlet when pressure in the PRV inlet falls below a predetermined threshold.

The selection system can be configured to be retrofitted to the PRV.

The pressure regulating valve can further comprise a designated socket at an area of its inlet to which the selection system is to be connected in pressure communication.

The pressure-motion transducer can further comprise a piston configured to move or a membrane configured to deform when the pressure-motion transducer is brought to pressure communication with the PRV inlet.

The pressure-motion transducer can further comprise an actuator element connected to the piston or membrane and configured to displace when the piston moves or the membrane deforms.

The auxiliary valve can be a three way valve further comprising a second auxiliary outlet.

The second auxiliary outlet can be a spout configured to be in pressure communication with the atmosphere.

According to another aspect of the presently disclosed subject matter there is provided a selection system configured to cooperate with a PRV having a PRV inlet at an upstream end thereof, a PRV outlet at a downstream end thereof, and a pressure regulating system operatively disposed therebetween being configured to maintain a set pressure at the PRV outlet by regulating the flow of fluid between the PRV inlet and the PRV outlet, so as to select between two working pressures of the PRV based on pressure of the fluid at the PRV inlet, and to direct the pressure regulating system to maintain the set pressure at the outlet at the selected working pressure, the selection system comprising:

(a) a pressure-motion transducer operatively connected to the pressure regulating system so as to actively direct the set pressure when being brought into pressure communication with the PRV inlet; and (b) an auxiliary valve having an auxiliary inlet configured to connect in pressure communication with the PRV inlet, and an auxiliary outlet connected in pressure communication with the pressure-motion transducer; the auxiliary valve being configured to selectively establish pressure communication between its auxiliary inlet and auxiliary outlet when pressure in the PRV inlet traverses a predetermined threshold, thereby bringing the pressure-motion transducer into pressure communication with the PRV inlet.

The pressure regulating system can further comprise a controlling element configured to control the set pressure of the PRV, and wherein the pressure motion transducer can be configured to operate the controlling element so as to direct the set pressure of the PRV.

The controlling element can be mechanical.

The controlling element can be a spring configured to compress to increase the set pressure and decompress to lower the set pressure of the PRV.

The pressure regulating system can further comprise a control chamber in pressure communication with the PRV inlet, and wherein the pressure regulating system can be configured to facilitate restriction to fluid flow between the PRV inlet and the PRV outlet when the control chamber is pressurized and release the restriction when the control chamber depressurizes.

The pressure regulating system can further comprise a pilot valve in pressure communication with the control chamber and the PRV outlet, which is configured to depressurize the control chamber when pressure at the outlet traverses a predetermined threshold.

The controlling element can constitute a part of the pilot valve.

The selection system can be hydraulically operated.

The pressure regulating system can be hydraulically operated.

The auxiliary valve can be a three way valve.

The auxiliary valve can be configured to selectively establish pressure communication between its auxiliary inlet and auxiliary outlet when pressure in the PRV inlet falls below a predetermined threshold.

The pressure regulating valve can further comprise a designated socket at an area of its inlet to which the selection system is configured to connect in pressure communication.

The pressure-motion transducer can further comprise a piston configured to move or a membrane configured to deform when the pressure-motion transducer is brought to pressure communication with the PRV inlet.

The pressure-motion transducer can further comprise an actuator element connected to the piston or the membrane which is configured to displace when the piston moves or the membrane deforms.

The auxiliary valve can be a three way valve further comprising a second auxiliary outlet.

the second auxiliary outlet can be a spout configured to be in pressure communication with the atmosphere.

According to one configuration of the system, the PRV is a direct acting PRV.

In certain configurations of the auxiliary valve it can establish pressure communication between its auxiliary inlet and auxiliary outlet when pressure in the PRV inlet of the PRV exceeds the predetermined threshold, while in others when it falls below that threshold.

The selection system of the presently disclosed subject matter is configured to cooperate with a PRV, however, it can be appreciated that this system can be suitable for cooperation with a number of other equivalent valves having adjustable working mode, such as pressure regulating valves configured to maintain pressure upstream at a predetermined set pressure, overflow valves in a reservoir configured to maintain a predetermined liquid level in the reservoir, flow regulating valves configured to maintain a predetermined flow rate downstream, etc.

The term 'pressure reducing valve' (PRV) in the specification and claims as used herein denotes any valve designated for regulating a variable pressure profile upstream to a steady pressure profile downstream, having an output pressure setting. The PRV can be a pilot operated PRV, a direct acting PRV, or any other PRV having a manipulable set-pressure controlling element configured to set value of the output pressure.

The term 'pressure-motion transducer' as used herein denotes any kind of device capable of translating hydraulic pressure to mechanical motion. The 'pressure-motion transducer' can be diaphragm based, a piston assembly, an expandable sheath, etc.

BRIEF DESCRIPTION OF THE DRAWINGS

In order to better understand the subject matter that is disclosed herein and to exemplify how it may be carried out in practice, examples will now be described, by way of non-limiting examples only, with reference to the accompanying drawings, in which.

DETAILED DESCRIPTION

One aspect of the presently disclosed subject matter relates to hydraulically operated PRVs capable of reducing upstream pressure, firstly to a first set-pressure, and secondly to a second set-pressure typically lower than the first set-pressure.

One of the motivations to have two set-pressures in a PRV is saving water and energy under changing consumption demands. When consumption is low, high pressure in a pipeline isn't necessary, and in some cases it can build up and increase water leakage through any cracks in the system. A PRV capable of producing two steady pressure profiles downstream, one for high demand and the other for low demand, can save water and energy to an entire water system.

Figure 1:
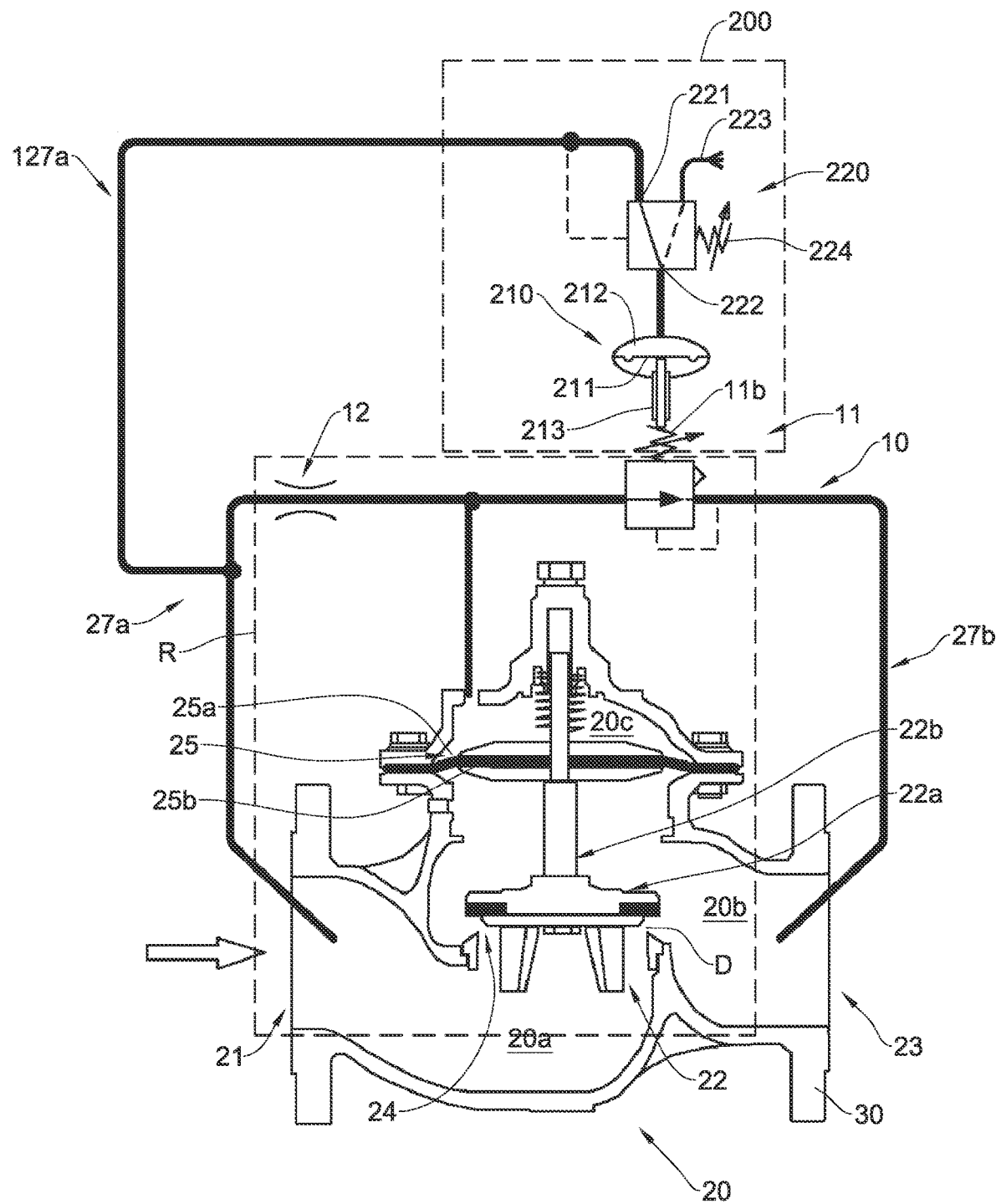
FIG. 1 is a schematic front section view of a pilot operated PRV according to one example of the presently disclosed subject matter.

Attention is now directed to FIG. 1 of the drawings, illustrating a PRV comprising a PRV inlet 21 at an upstream end thereof, a PRV outlet 23 at a downstream end thereof, and a pressure regulating system R disposed therebetween configured to maintain a set pressure at the PRV outlet 23 by regulating the flow of fluid between the PRV inlet and the PRV outlet.

The set pressure herein refers to both a pressure of a constant value and to a range of pressures defined between pre-determined boundaries, this set pressure can be selected from two or more distinct working pressures of the PRV as will be explained hereinafter.

The PRV illustrated in FIG. 1 is a pilot operated PRV comprising a main valve assembly 20 having a body 30, and a pressure regulating system comprising a pressure regulator 22 and a pilot system 10, configured to apply a variable restriction to fluid flowing between the PRV inlet 21 and the PRV outlet.

The pressure regulator 22 acts upon passageway 24, disposed between the PRV inlet 21 and the PRV outlet 23, and is configured to restrict the fluid flow through the passageway 24.

More specifically, the pressure regulator 22 comprises a plug 22a and an actuating stem 22b, whereas the actuating stem 22b is configured to move the plug 22a towards and away from the passageway 24, so as to obstruct the fluid flow therethrough. The extent of obstruction is inversely proportional to the distance D of the plug 22a from the passageway 24, i.e., as D increases the obstruction is lessened and vice versa.

The actuating stem 22b is actuated by a diaphragm 25 connected to it from an opposite side to the plug 22a. The diaphragm 25 moves the actuating stem 22b as it deforms in response to pressure differentiation between its upper surface 25a and its lower surface 25b, more specifically, in response to pressure differentiation between pressure zones towards which its upper and lower surfaces are facing.

It can be assumed that the interior of the main valve assembly 20 is divided into three pressure zones:
 (a) an inlet pressure zone 20a, which is subjected to inlet pressure.
 (b) an outlet pressure zone 20b, separated from the inlet pressure zone 20a by the plug 22a, which is subjected to outlet pressure, which is typically lower than the inlet pressure.
 (c) a control chamber 20c, separated from the outlet pressure zone 20b by the diaphragm 25, and having pressure communication with the inlet pressure zone 20a through bypass 27a.

When the control chamber 20c is subjected to upstream pressure, it applies a force on the diaphragm 25 which tends to push it down. Upon doing so, it is opposed by that same pressure pushing the plug 22a up, and because the area on which fluid force is acting is larger in the diaphragm 25 (i.e., surface 25a) than it is on the plug, the result is a larger force applying on the diaphragm 25 from its upper side facing control chamber 20c, than that applying on the plug 22a. This produces a net downwards force on the pressure regulator 22, which pushes the plug towards passageway 24, thereby restricting the fluid flow through the passageway 24, and eventually seal it completely, lowering downstream pressure.

As the control chamber 20c depressurizes, the pressure which pushes the diaphragm 25 down diminishes, whereas the pressure pushing the plug 22a up remains.

The result is a larger force on the plug 22a than on the diaphragm 25 and a net upwards force on the pressure regulator 22, which pushes the plug 22a up, allowing more fluid to flow through the passageway 24, thereby increasing the downstream pressure.

As mentioned, the PRV of FIG. 1 is a pilot operated PRV in which the pilot system 10 controls the pressure flow into and out from the control chamber 20c, thereby controlling the extent of obstruction to flow applied on fluid flowing in passageway 24 by the plug 22a, i.e., between the PRV inlet 21 and the PRV outlet 23.

The pilot system 10 illustrated in FIG. 1 comprises a pressure-actuated two way pilot valve 11, and an orifice 12.

The pilot valve 11 is mounted on bypass 27b, connecting between the control chamber 20c and the PRV outlet 23 of the main valve assembly, and is configured to selectively control the releasing of pressure from control chamber 20c through the PRV outlet 23.

The pilot valve 11 senses the outlet pressure via bypass 27b and is configured to open and release the pressure from the control chamber 20c to the PRV outlet 23 by establishing pressure communication between the PRV outlet 23 and the control chamber 20c when outlet pressure drops beneath its set-pressure. This causes the pressure regulator 22 to go up and allows more fluid flow through passageway 24, thereby increasing the outlet pressure of the PRV.

The pilot valve 11 is further configured to cut the pressure communication between the PRV outlet 23 and the control chamber 20c when outlet pressure rises again above the set-pressure. This causes the pressure regulator 22 to go down and allows more fluid flow through passageway 24, thereby lowering the outlet pressure of the PRV.

The orifice 12 is mounted on the bypass 27a, and is configured to restrict the pressure flow between the control chamber 20c of the main valve assembly and the PRV inlet 21, so that when the pilot valve 11 opens and establishes pressure communication between the control chamber 20c and the PRV outlet 23, more fluid is being released out of chamber 20c than that entering through orifice 12 from the PRV inlet 21.

The set-pressure value, characterizing the pilot valve 11 and by that the entire PRV 20, can be directed by manipulating a set-pressure controlling element, such as spring 11b, for instance, by compressing it, e.g., by pressing it downwards.

In this example, compression of the spring 11b defines higher values for the set-pressure of the PRV, whilst decompression of the spring 11b defines lower values for the set-pressure of the PRV.

Figure 3:
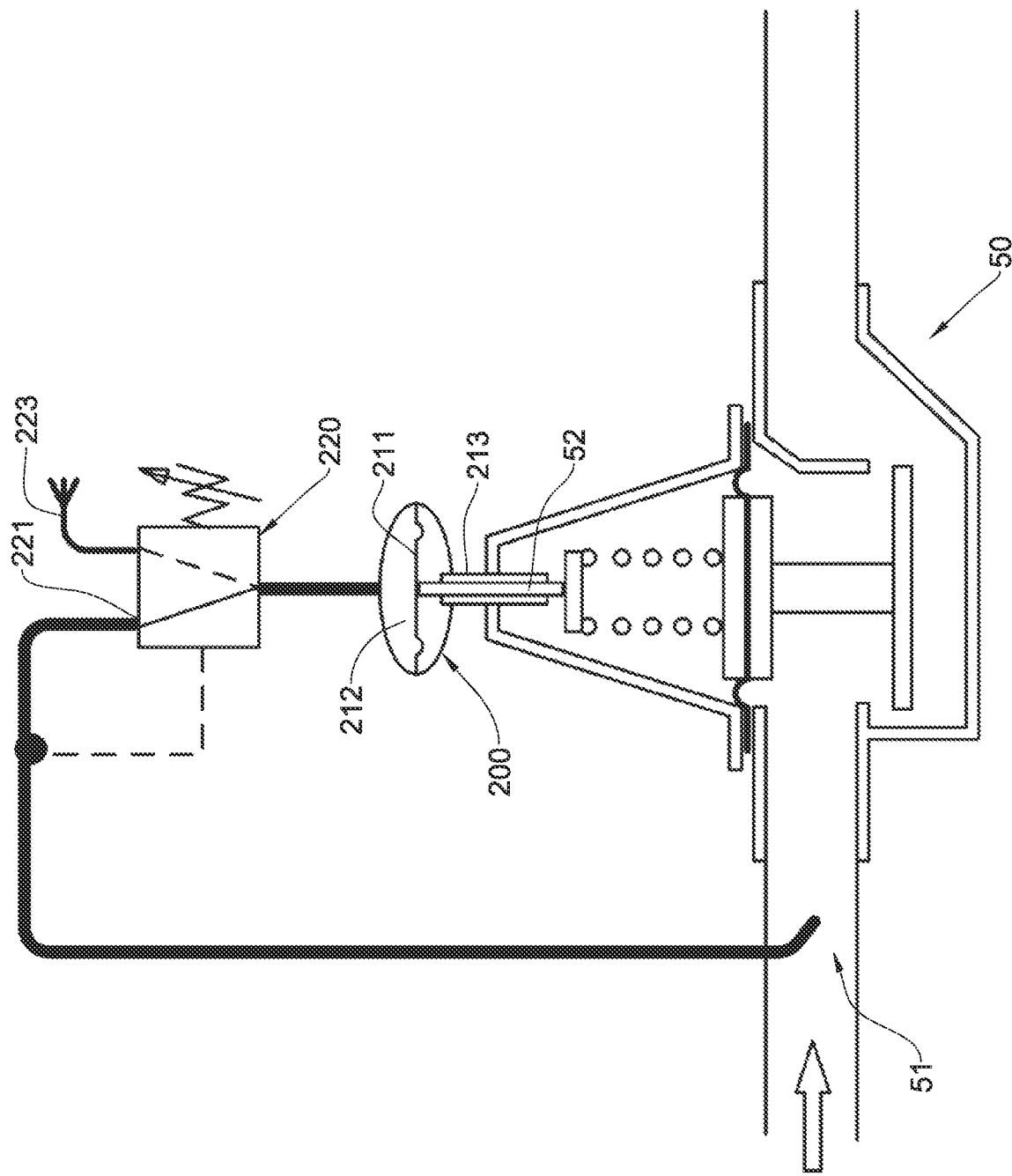
FIG. 3 is a schematic front section view of a direct-operation PRV according to another example of the presently disclosed subject matter.

In other examples in which a PRV which do not include a pilot valve is used, such as a direct-action spring-loaded PRV, the set-pressure controlling element can be connected directly to the pressure regulator, which constitutes as the set-pressure controlling element in this case, as seen in FIG. 3.

The PRV further comprises a selection system, designated herein as 200 which is configured to select between two working pressures of the PRV, and to direct the pressure regulating system to maintain the set pressure at the outlet at the selected working pressure, based on the pressure of the fluid at the PRV inlet.

Herein this selection system is operatively connected to the set pressure controlling element of the pilot valve as will be explained hereinafter.

The selection system 200 comprises a pressure-motion transducer, constituted by bias chamber 210, operatively connected to the pressure regulating system, and specifically to spring 11b, so as to actively direct the set pressure of the PRV.

The bias chamber 210 comprises a diaphragm like membrane 211 disposed within an operative chamber 212 of the bias chamber, and configured to deform as the operative chamber 212 pressurizes.

An actuator element 213 of the bias chamber 210 operatively connected to the membrane 211 and the spring 11b, enables conversion of the deformation of the membrane 211 into mechanical movement of the spring 11b, in this example, this movement is linear on the vertical axis and causes the spring 11b to compress or decompress accordingly, thereby directing the set pressure of the PRV.

an auxiliary valve, constituted by pressure-actuated three-way valve 220 mounted on bypass 127a and having an auxiliary inlet 221 connected in pressure communication with the PRV inlet 21, and an auxiliary outlet 222 connected in pressure communication with the pressure-motion transducer, is configured to selectively establish pressure communication between its auxiliary inlet 221 and auxiliary outlet 222 when pressure in the PRV inlet 21 traverses a predetermined threshold, thereby bringing the bias chamber 210 and namely the operative chamber 212 of the bias chamber, into pressure communication with the PRV inlet 21, causing it to pressurize. In this example this pressure communication is established when pressure at the PRV inlet 21 is below the predetermined threshold, indicating high demand on the pipeline as will be explained hereinafter.

The auxiliary valve 220 is further configured to cut this pressure communication and establish pressure communication between auxiliary outlet 222 and spout 223 when the pressure at the PRV inlet 21 is above the predetermined threshold, thereby cutting the pressure communication between the bias chamber 210 and the PRV inlet 21 of the PRV and releasing the pressure from the bias chamber 210 through spout 223.

When the operative chamber 212 depressurizes, biasing means inside the bias chamber 210 force the membrane back up, thereby changing again the set pressure of the PRV.

As a whole, the auxiliary valve 220 is configured to selectively control the pressure supply from the PRV inlet 21 to the operative chamber 212 of the bias chamber 210.

At the configuration described, any deformation of the membrane 211 due to pressurization of operative chamber 212 causes the actuator element 213 to move linearly and change the compression of the spring 11b, resulting in changing the set-pressure value of the PRV 20. Maximal deformation of the membrane 211 correlates with a first set-pressure value of the PRV 20, and minimal deformation of the membrane 211 correlates with a second set-pressure value of the PRV 20, which is typically lower than the first.

Overall, when the demand on the pipeline is high, i.e., the pressure at the PRV inlet 21 is below the pre-determined threshold of auxiliary valve 220, and the pressure communication between the PRV inlet 21 and the operative chamber 212 is established by the auxiliary valve 220. In this case the spring 11b is at its most compressed state directing the set pressure of the PRV to a first set pressure value. When the demand is low enough, the pressure at the PRV inlet 21 is above the pre-determined threshold of auxiliary valve 220, and the pressure communication between the PRV inlet 21 and the operative chamber 212 is cut by the auxiliary valve 220, and pressure communication is established between the operative chamber 212 and the spout 213, which causes venting of pressure from the operative chamber through the spout 213. As a result, the operative chamber 212 depressurizes and the membrane 211 deforms upwards, moving the actuator element 213 with it, thereby causing the spring 11b to decompress until it reaches to its most decompressed state, thereby directing the set pressure of the PRV to a second set pressure, normally lower than the first.

When the pressure at the PRV inlet 21 lowers again below the predetermined threshold of the three way valve 220, the auxiliary valve 220 establishes again the pressure communication between the PRV inlet 21 and the operative chamber 212, thereby causing the operative chamber 212 to pressurize. As a result the membrane 211 deforms back down until it reaches its lowest point, and with it the actuator element 213 lowers and compresses the spring 11b, thereby setting the set-pressure of the PRV 20 to back to the first set-pressure value.

The threshold pressure value of auxiliary valve 220 can be predetermined by manipulating a second set-pressure controlling element, such as adjustable spring 224 integral with the auxiliary valve 220, for instance, by compressing it.

Eventually the entire dual set-point system 200 together with the PRV 20 can be associated with at least two different set-pressure values to be maintained downstream. These set-pressures are correlated with the pressure sensed by auxiliary valve 220 at the PRV inlet 21, i.e., correlated with the demand on the pipeline.

The main valve assembly can be any diaphragm or piston operated, hydraulically actuated control-valve, operable in direct action or by a pilot valve such as pilot valve 11. The pilot valve 11 can be any standard or non-standard pressure sensitive valve, used to control pressure supply, and having a manipulable set-pressure controlling element.

Figure 4:
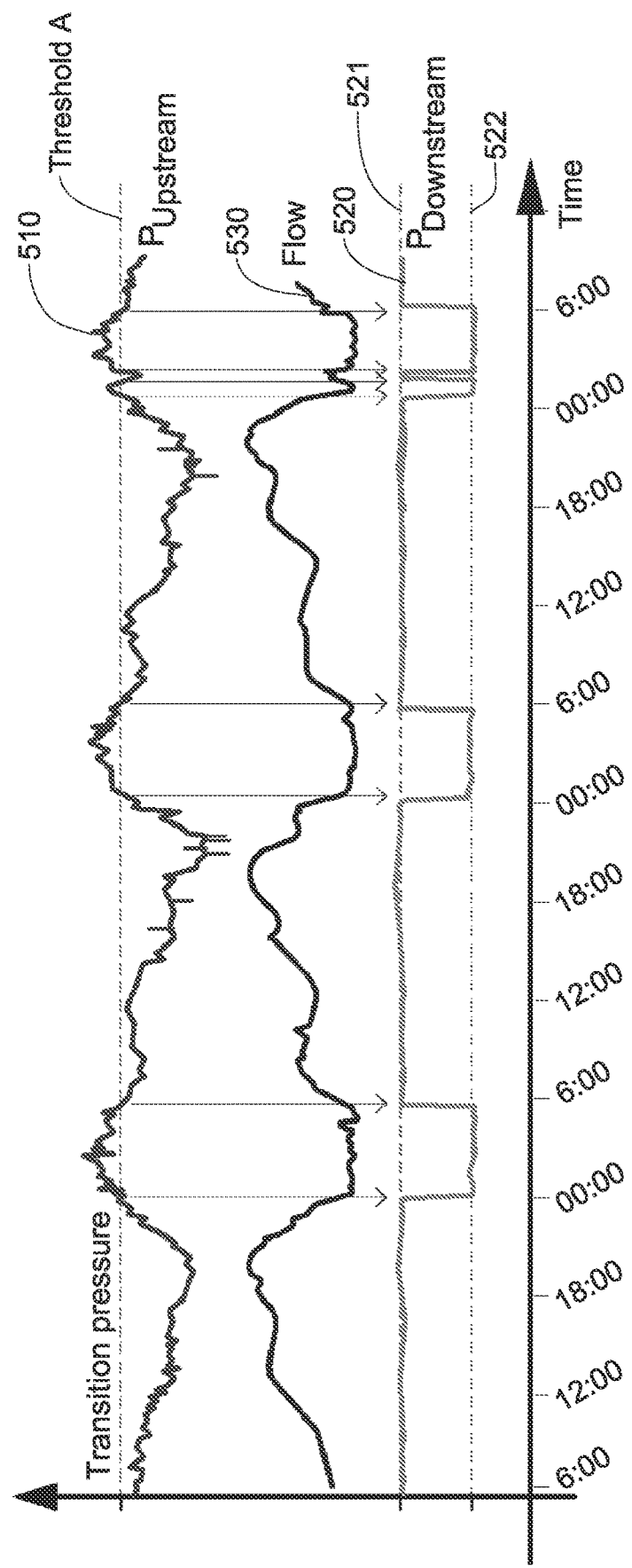
FIG. 4 is a graph showing an example of the effect of a PRV, according to the presently disclosed subject matter, on a pipeline.

FIG. 4 illustrates graphically an example of the pressure change over time in a pipeline mounted with a PRV comprising the selection system as described herein.

Line 510 shows a typical upstream pressure profile.

Line 520 shows a steady downstream pressure profile, varying between a steady first set-pressure value 521, and a steady second set-pressure value 522, which is lower than the first.

It can be seen that the pressure upstream is flattened downstream to the first set-pressure value 521 when pressure upstream 510 is below threshold A. It can also be seen that the pressure upstream is flattened downstream to the second set-pressure value 522 when pressure upstream 510 is above threshold A (i.e., above the transition pressure).

FIG. 4 further includes a flow line 530, which is correlated with the pressure line 510. It can be appreciated that instead of sensing pressure, auxiliary valve 220 can be configured to sense flow, as these two parameters are correlated.

It can be appreciated that the system 200 comprising the auxiliary valve and the bias chamber can be retrofitted on any existing PRV, converting it to a dual set-point PRV.

Figure 2:
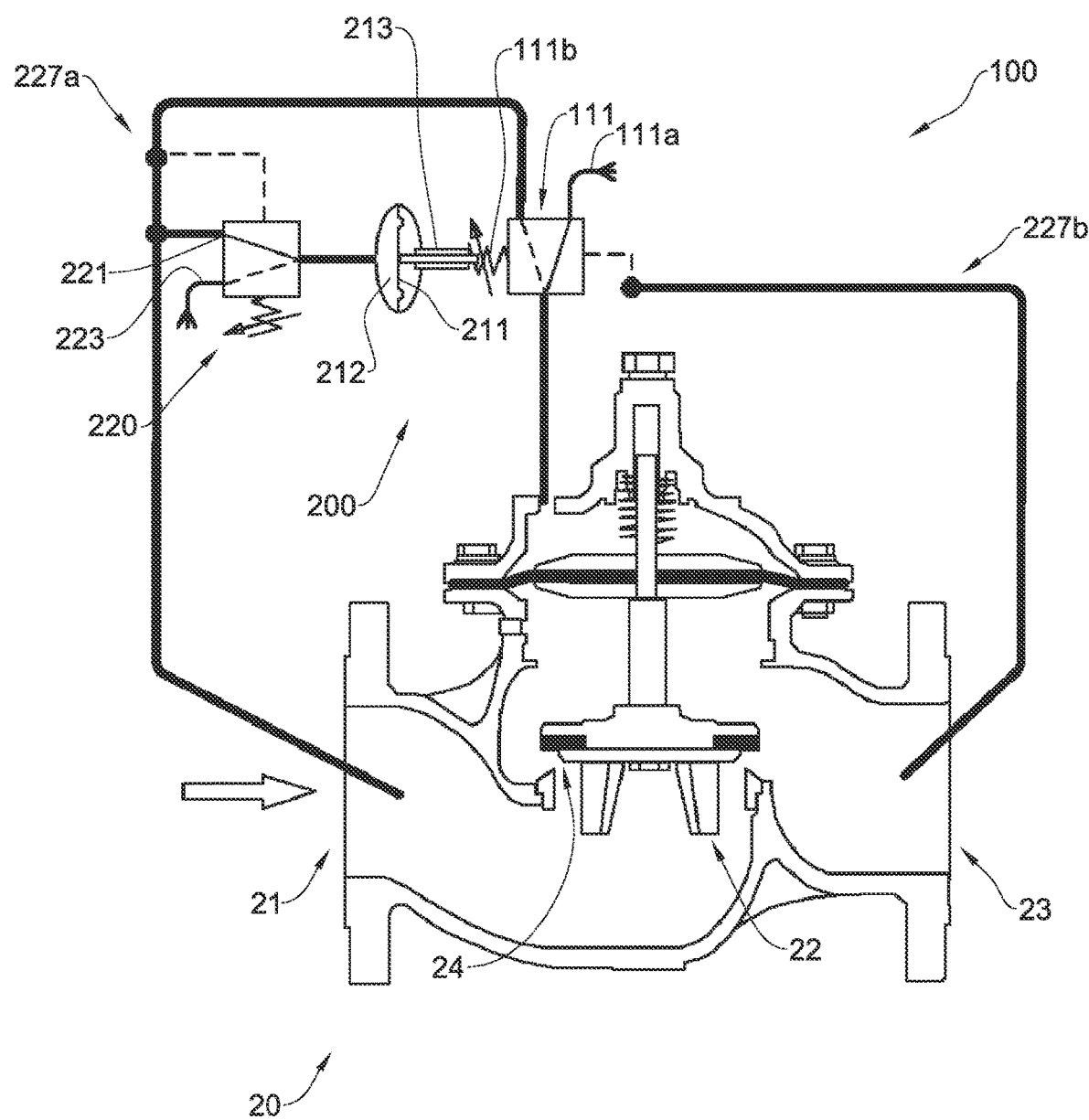
FIG. 2 is a schematic front section view of a pilot operated PRV according to another example of the presently disclosed subject matter.

Another example of a pilot operated PRV is schematically illustrated in FIG. 2, where it is shown to comprise a main valve assembly 20 identical to the one in FIG. 1, and a pilot system 100 comprising a pressure-actuated three way pilot valve 111 mounted on bypass 227a, and selectively controls the pressure supply to control chamber 20c of the PRV 20.

Similarly to the pilot valve 11 of FIG. 1, The pilot valve 111 senses the pressure at the PRV outlet 23 via bypass 227b, and releases the pressure from the control chamber 20c when outlet pressure drops beneath a predetermined set-pressure.

In this example, the pilot valve 11 is configured to cut the pressure communication between the PRV inlet 21 and the control chamber 20c when the outlet pressure drops beneath the set-pressure, and release the pressure remaining in the control chamber 20c, through spout 111a to the open air.

The pilot valve 11 is further configured to reestablish the pressure communication between the PRV inlet 21 and the control chamber 20c when outlet pressure rises again above the set-pressure.

The set-pressure value can be determined by manipulating a set-pressure controlling element, such as lever 111b comprised by the pilot valve 111, for instance, by changing its height.

The system 200 installed on the PRV 20 of FIG. 2 is identical to the system 200 of FIG. 1.

As illustrated, the actuator element 213 connects with the set-pressure controlling element, i.e., lever 111b so as to change the set-pressure value characterizing the PRV 20 between a first set-pressure and a second set-pressure, by changing its height.

The actuator element 213 is connected to the membrane 211 which deforms when the operative chamber 212 pressurizes.

The auxiliary inlet 221 of the auxiliary valve 220, is connected in pressure communication with the PRV inlet 21, through bypass 227a, and the auxiliary valve 220 is configured to sense the pressure upstream therethrough. The auxiliary valve is further configured to establish pressure communication between the PRV inlet 21 and the operative chamber 212 when pressure at the PRV inlet 21 goes below its pre-determined threshold. As before, this establishment causes the operative chamber 212 to pressurize, which causes the membrane 211 to deform and the lever 111b to move along with it so that the set-pressure value characterizing the PRV 20 changes.

Similarly, FIG. 3 schematically illustrates the system 200 when installed on a direct action spring-loaded PRV 50.

As previously mentioned, the actuator element 213 connects with lever 52 of the PRV 50, which constitutes as the set-pressure controlling element of the PRV 50, such that it is configured to change its height, and by that to change the set-pressure value characterizing the PRV 50.

Similarly, the auxiliary valve inlet 221 is connected in pressure communication with the PRV inlet 51 of the PRV 50, so that the auxiliary valve 220 can sense the pressure thereat and establish pressure communication between the operative chamber 212 and the PRV inlet 51 when the pressure at the PRV inlet 51 goes below its transition pressure.

In all the examples illustrated herein the auxiliary valve is configured to facilitate pressure transfer to the pressure-motion transducer when pressure at the PRV inlet falls below a predetermined threshold, however, in other implementations of the presently disclosed subject matter, the auxiliary valve can be configured to facilitate pressure transfer to the pressure-motion transducer when other conditions are met, for example when pressure at the PRV inlet exceeds a threshold pressure, when flow at the PRV inlet traverses a certain pressure, when temperature changes at the PRV inlet, when water level in a control water reservoir is changing, etc.

It is also appreciated that the auxiliary valve can be configured to sense these conditions in areas at the pipeline other than the PRV inlet, for example at the PRV outlet, or at any other information contributing area.

The invention claimed is:

1. A pressure regulating valve (PRV), comprising:
  a PRV inlet at an upstream end thereof;
  a PRV outlet at a downstream end thereof;
  a pressure regulating system operatively disposed therebetween being configured to maintain a set pressure at the PRV outlet by regulating a flow of fluid between the PRV inlet and the PRV outlet, said set pressure being a selected one from a first pre-determined working pressure of the PRV and a distinct, second pre-determined working pressure of the PRV; and
  a selection system configured to select between said first and second pre-determined working pressures based on a pressure of the fluid at the inlet of the PRV, and to direct the pressure regulating system to maintain the set pressure at the outlet at the selected one of the first and second pre-determined working pressure, said selection system comprising:
    (a) a pressure-motion transducer operatively connected to the pressure regulating system so as to actively direct the pressure regulating system to maintain the set pressure at the outlet at the selected one of the first and second pre-determined working pressures when being brought into pressure communication with the PRV inlet; and
    (b) an auxiliary valve having an auxiliary inlet connected in pressure communication with the PRV inlet, and an auxiliary outlet connected in pressure communication with the pressure-motion transducer; the auxiliary valve being configured to selectively establish pressure communication between its auxiliary inlet and auxiliary outlet when pressure in the PRV inlet falls below a predetermined threshold, thereby bringing the pressure-motion transducer into pressure communication with the PRV inlet, which in turn, directs the pressure regulating system to maintain the set pressure at the outlet at the selected one of the first and second pre-determined working pressures.

2. The pressure regulating valve according to claim 1, further comprising a designated socket at an area of its inlet to which said selection system is configured to connect in pressure communication.

3. The pressure regulating valve according to claim 1, wherein said pressure-motion transducer further comprises a membrane configured to deform when said pressure-motion transducer is brought to pressure communication with said PRV inlet.

4. The pressure regulating valve according to claim 3, wherein said pressure-motion transducer further comprises an actuator element connected to said membrane and configured to displace when said membrane deforms.

5. The pressure regulating valve according to claim 1, wherein said auxiliary valve includes a three way valve and further comprises a second auxiliary outlet.

6. The pressure regulating valve according to claim 5, wherein said second auxiliary outlet includes a spout configured to be in pressure communication with the atmosphere.

7. The pressure regulating valve according to claim 1, wherein said pressure regulating system further comprises a controlling element configured to facilitate controlling said set pressure of the PRV, and wherein said pressure motion transducer is configured to operate said controlling element so as to direct the set pressure of the PRV.

8. The pressure regulating valve according to claim 7, wherein said controlling element mechanically connects the selection system and the pressure regulating system.

9. The pressure regulating valve according to claim 8, wherein said controlling element comprises a spring, and wherein the set pressure of the PRV is associated with an extent of compression of the spring.

10. The pressure regulating valve according to claim 1, wherein said pressure regulating system further comprises a control chamber in pressure communication with the PRV inlet, and wherein said pressure regulating system is configured to facilitate restriction to fluid flow between the PRV inlet and the PRV outlet when said control chamber is pressurized.

11. The pressure regulating valve according to claim 10, wherein said pressure regulating system further comprises a pilot valve in pressure communication with the control chamber and the PRV outlet which is configured to depressurize said control chamber when pressure at the outlet traverses a predetermined threshold.

12. The pressure regulating system according to claim 11, wherein said pressure regulating system further comprises a controlling element configured to facilitate controlling said set pressure of the PRV, and wherein said pressure motion transducer is configured to operate said controlling element so as to direct the set pressure of the PRV, wherein said pilot valve comprises said controlling element.

13. A selection system configured to cooperate with a pressure regulating valve (PRV) having a PRV inlet at an upstream end thereof, a PRV outlet at a downstream end thereof, and a pressure regulating system operatively disposed therebetween being configured to maintain a set pressure at the PRV outlet by regulating a flow of fluid between the PRV inlet and the PRV outlet, so as to select between distinct first and second working pressures of the PRV based on pressure of the fluid at the PRV inlet, and to direct the pressure regulating system to maintain the set pressure at the outlet at the selected one of the first and second working pressures, said selection system comprising:
  (a) a pressure-motion transducer configured to be operatively connected to the pressure regulating system so as to actively direct pressure regulating system to maintain the set pressure at the outlet at said set pressure when being brought into pressure communication with the PRV inlet; and
  (b) an auxiliary valve having an auxiliary inlet configured to connect in pressure communication with the PRV inlet, and an auxiliary outlet connected in pressure communication with the pressure-motion transducer; the auxiliary valve being configured to selectively establish pressure communication between the auxiliary inlet and the auxiliary outlet when pressure in the PRV inlet falls below a predetermined threshold, thereby bringing the pressure-motion transducer into pressure communication with the PRV inlet, which in turn, directs the pressure regulating system to maintain the set pressure at the outlet at the selected one of the first and second pre-determined working pressures.

14. The selection system according to claim 13, wherein said auxiliary valve is configured to selectively establish pressure communication between its auxiliary inlet and auxiliary outlet when pressure in the PRV inlet of the PRV falls below a predetermined threshold.

15. The selection system according to claim 13, wherein said selection system is further configured to connect in pressure communication with a designated socket at an area of the PRV inlet.

16. The selection system according to claim 13, wherein said pressure-motion transducer further comprises a membrane configured to deform when said pres sure-motion transducer is brought to pressure communication with said PRV inlet.

17. The selection system according to claim 13, wherein said auxiliary valve is a three way valve and further comprises a second auxiliary outlet.

18. The selection system according to claim 13, wherein said pressure regulating system further comprises a controlling element which controls said set pressure of the PRV, and wherein said pressure motion transducer is configured to operate said controlling element so as to direct the set pressure of the PRV.

19. The selection system according to claim 13, wherein said pressure regulating system further comprises a control chamber in pressure communication with the PRV inlet, and wherein said pressure regulating system is configured to facilitate restriction to fluid flow between the PRV inlet and the PRV outlet when said control chamber is pressurized and release said restriction when said control chamber depressurizes.

20. A pressure regulating valve (PRV), comprising:
  a PRV inlet at an upstream end thereof;
  a PRV outlet at a downstream end thereof;
  a pressure regulating system operatively disposed therebetween being configured to maintain a set pressure at the PRV outlet by regulating a flow of fluid between the PRV inlet and the PRV outlet, said set pressure being a selected one from a first pre-determined working pressure of the PRV and a distinct, second pre-determined working pressure of the PRV; and
  a selection system configured to select between said first and second pre-determined working pressures based on a pressure of the fluid at the inlet of the PRV, and to direct the pressure regulating system to maintain the set pressure at the outlet at the selected one of the first and second pre-determined working pressure, said selection system comprising:
    (a) a pressure-motion transducer operatively connected to the pressure regulating system so as to actively direct the pressure regulating system to maintain the set pressure at the outlet at the selected one of the first and second pre-determined working pressures when being brought into pressure communication with the PRV inlet; and
    (b) an auxiliary valve having an auxiliary inlet connected in pressure communication with the PRV inlet, a first auxiliary outlet connected in pressure communication with the pressure-motion transducer, and a second auxiliary outlet including a spout configured to be in pressure communication with the atmosphere; the auxiliary valve being configured to selectively establish pressure communication between its auxiliary inlet and auxiliary outlet when pressure in the PRV inlet is below a predetermined threshold, thereby bringing the pressure-motion transducer into pressure communication with the PRV inlet, which in turn, directs the pressure regulating system to maintain the set pressure at the outlet at the selected one of the first and second pre-determined working pressures, and to selectively establish pressure communication between its first auxiliary outlet and second auxiliary outlet when the pressure in the PRV inlet is above the predetermined threshold, thereby releasing the pressure from the pressure-motion transducer into the atmosphere.

* * * * *